United States Patent
Zhang et al.

(10) Patent No.: US 10,588,159 B2
(45) Date of Patent: Mar. 10, 2020

(54) CONTENTION WINDOW WITH SPATIAL LBT

(71) Applicant: QUALCOMM Incorporated, San Diego, CA (US)

(72) Inventors: Xiaoxia Zhang, San Diego, CA (US); Taesang Yoo, San Diego, CA (US); Seyed Ali Akbar Fakoorian, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/976,301

(22) Filed: May 10, 2018

(65) Prior Publication Data

US 2018/0359780 A1    Dec. 13, 2018

Related U.S. Application Data

(60) Provisional application No. 62/517,058, filed on Jun. 8, 2017.

(51) Int. Cl.
| | |
|---|---|
| *H04L 5/12* | (2006.01) |
| *H04W 74/08* | (2009.01) |
| *H04B 7/0456* | (2017.01) |
| *H04B 7/0417* | (2017.01) |
| *H04B 7/06* | (2006.01) |
| *H04W 72/10* | (2009.01) |

(52) U.S. Cl.
CPC ........ *H04W 74/085* (2013.01); *H04B 7/0417* (2013.01); *H04B 7/0478* (2013.01); *H04B 7/0697* (2013.01); *H04W 72/10* (2013.01)

(58) Field of Classification Search
CPC .......... H04W 74/0816; H04W 74/085; H04W 16/14; H04W 24/02; H04L 1/0054; H04L 1/005; H04B 7/0626
USPC .......................... 375/262, 260, 269; 370/310
See application file for complete search history.

(56) References Cited

U.S. PATENT DOCUMENTS

| | | | |
|---|---|---|---|
| 2011/0182171 A1* | 7/2011 | McNew | H04L 1/188 370/216 |
| 2016/0262185 A1* | 9/2016 | Ghosh | H04W 72/04 |
| 2019/0044634 A1* | 2/2019 | Cui | H04B 17/382 |
| 2019/0132875 A1* | 5/2019 | Ljung | H04L 5/0048 |

* cited by examiner

*Primary Examiner* — Khai Tran
(74) *Attorney, Agent, or Firm* — Liem T. Do

(57) ABSTRACT

Consideration of contention windows with spatial listen before talk (LBT) operations is discussed. In multiple input, multiple output (MIMO) transmission operations over a shared transmission medium, use of spatial LBT transmissions may be implemented with fairness options and parameters influenced by a condition of the MIMO transmitter, such conditions as the level of MIMO capability or the enablement of polite spatial LBT nulling transmissions. When a MIMO transmitter identifies data for transmission, it may determine a configuration of the medium access contention operation, synchronous or asynchronous content, based on the condition of the MIMO transmitter. The MIMO transmitter may then transmit the data either using spatial LBT transmission or not according to the configuration of the medium access contention operation.

28 Claims, 8 Drawing Sheets

CONTENTION WINDOW WITH SPATIAL LBT

CROSS-REFERENCE TO RELATED APPLICATIONS

This application claims the benefit of U.S. Provisional Patent Application No. 62/517,058, entitled "CONTENTION WINDOW WITH SPATIAL LBT," filed on Jun. 8, 2017, which is expressly incorporated by reference herein in its entirety.

BACKGROUND

Field

Aspects of the present disclosure relate generally to wireless communication systems, and more particularly, to consideration of contention window with spatial listen before talk (LBT) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication, includes identifying, by a multiple input, multiple output (MIMO) transmitter, data for transmission, wherein the MIMO transmitter communicates using a transmission medium shared by one or more transmitter-receiver pairs, determining, by the MIMO transmitter, a configuration of a medium access contention operation based on a condition of the MIMO transmitter, and transmitting the data by the MIMO transmitter using the transmission medium according to the configuration of the medium access contention operation.

In an additional aspect of the disclosure, a method of wireless communication, includes counting down, by a transmitter node, a first random number within a first contention window for access to a first transmission link of a transmission medium shared by a plurality of transmitter nodes, detecting, at the transmitter node, a transmission signal on the first transmission link from another transmitter node of the plurality of transmitter nodes prior to expiration of the first random number, counting down, by the transmitter node in response to the transmission signal, a second random number within a second contention window for access to a second transmission link of the transmission medium, wherein the second transmission link resides in a null spatial dimension of the first transmission link of the transmission medium, and accessing the second transmission link, by the transmitter node, when no occupying signals are detected on the second transmission link after expiration of the second random number.

In an additional aspect of the disclosure, an apparatus configured for wireless communication, includes means for identifying, by a MIMO transmitter, data for transmission, wherein the MIMO transmitter communicates using a transmission medium shared by one or more transmitter-receiver pairs, means for determining, by the MIMO transmitter, a configuration of a medium access contention operation based on a condition of the MIMO transmitter, and means for transmitting the data by the MIMO transmitter using the transmission medium according to the configuration of the medium access contention operation.

In an additional aspect of the disclosure, an apparatus configured for wireless communication, includes means for counting down, by a transmitter node, a first random number within a first contention window for access to a first transmission link of a transmission medium shared by a plurality of transmitter nodes, means for detecting, at the transmitter node, a transmission signal on the first transmission link from another transmitter node of the plurality of transmitter nodes prior to expiration of the first random number, means for counting down, by the transmitter node in response to the transmission signal, a second random number within a second contention window for access to a second transmission link of the transmission medium, wherein the second transmission link resides in a null spatial dimension of the first transmission link of the transmission medium, and means for accessing the second transmission link, by the transmitter node, when no occupying signals are detected on the second transmission link after expiration of the second random number.

In an additional aspect of the disclosure, a non-transitory computer-readable medium having program code recorded thereon. The program code further includes code to identify, by a MIMO transmitter, data for transmission, wherein the MIMO transmitter communicates using a transmission medium shared by one or more transmitter-receiver pairs, code to determine, by the MIMO transmitter, a configuration of a medium access contention operation based on a condition of the MIMO transmitter, and code to transmit the data by the MIMO transmitter using the transmission medium according to the configuration of the medium access contention operation.

In an additional aspect of the disclosure, a non-transitory computer-readable medium having program code recorded thereon. The program code further includes code to count down, by a transmitter node, a first random number within a first contention window for access to a first transmission link of a transmission medium shared by a plurality of transmitter nodes, code to detect, at the transmitter node, a transmission signal on the first transmission link from another transmitter node of the plurality of transmitter nodes prior to expiration of the first random number, code to count down, by the transmitter node in response to the transmission signal, a second random number within a second contention window for access to a second transmission link of the transmission medium, wherein the second transmission link resides in a null spatial dimension of the first transmission link of the transmission medium, and code to access the second transmission link, by the transmitter node, when no occupying signals are detected on the second transmission link after expiration of the second random number.

In an additional aspect of the disclosure, an apparatus configured for wireless communication is disclosed. The apparatus includes at least one processor, and a memory coupled to the processor. The processor is configured to identify, by a MIMO transmitter, data for transmission, wherein the MIMO transmitter communicates using a transmission medium shared by one or more transmitter-receiver pairs, to determine, by the MIMO transmitter, a configuration of a medium access contention operation based on a condition of the MIMO transmitter, and to transmit the data by the MIMO transmitter using the transmission medium according to the configuration of the medium access contention operation.

In an additional aspect of the disclosure, an apparatus configured for wireless communication is disclosed. The apparatus includes at least one processor, and a memory coupled to the processor. The processor is configured to count down, by a transmitter node, a first random number within a first contention window for access to a first transmission link of a transmission medium shared by a plurality of transmitter nodes, to detect, at the transmitter node, a transmission signal on the first transmission link from another transmitter node of the plurality of transmitter nodes prior to expiration of the first random number, to count down, by the transmitter node in response to the transmission signal, a second random number within a second contention window for access to a second transmission link of the transmission medium, wherein the second transmission link resides in a null spatial dimension of the first transmission link of the transmission medium, and to access the second transmission link, by the transmitter node, when no occupying signals are detected on the second transmission link after expiration of the second random number.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
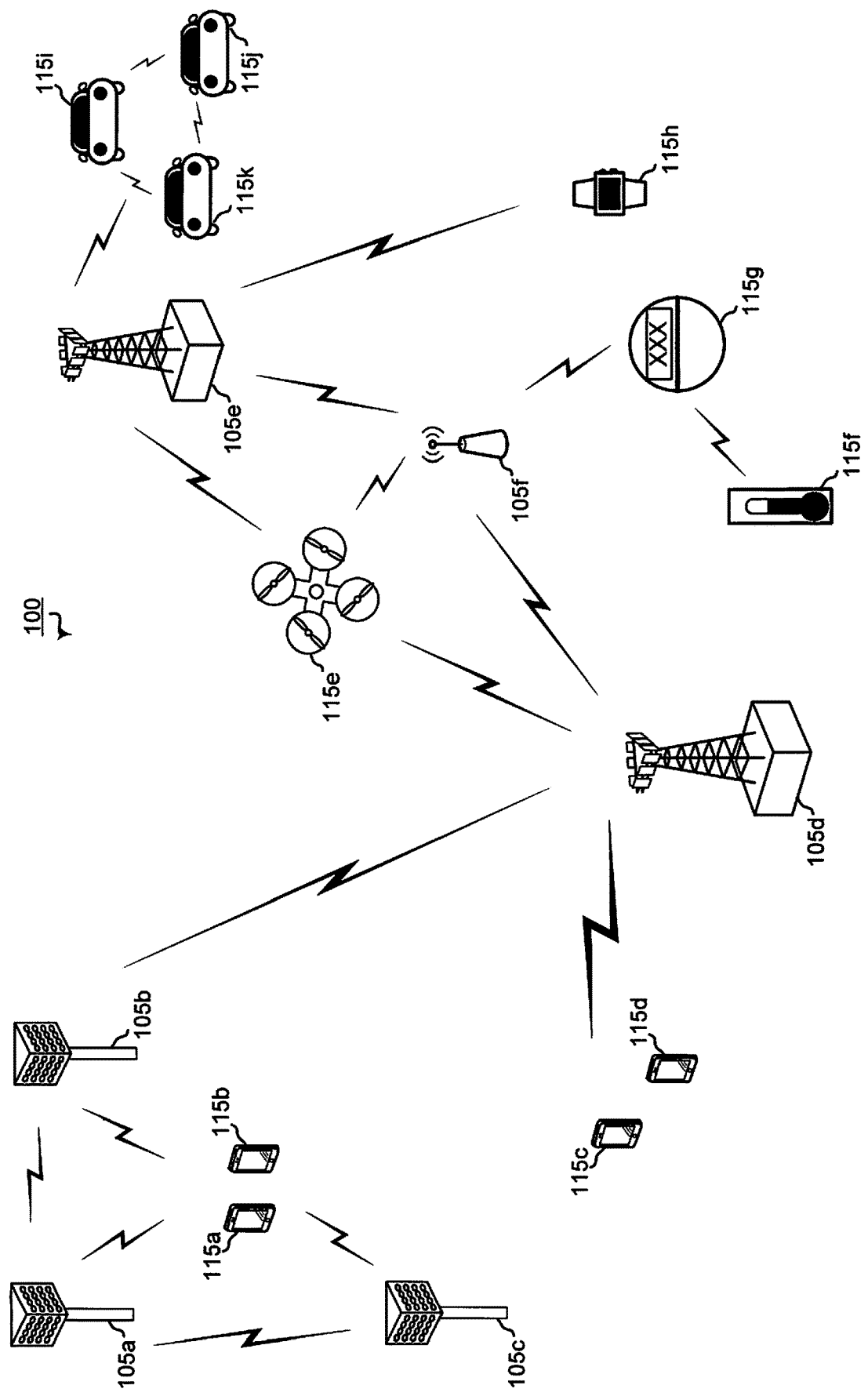
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
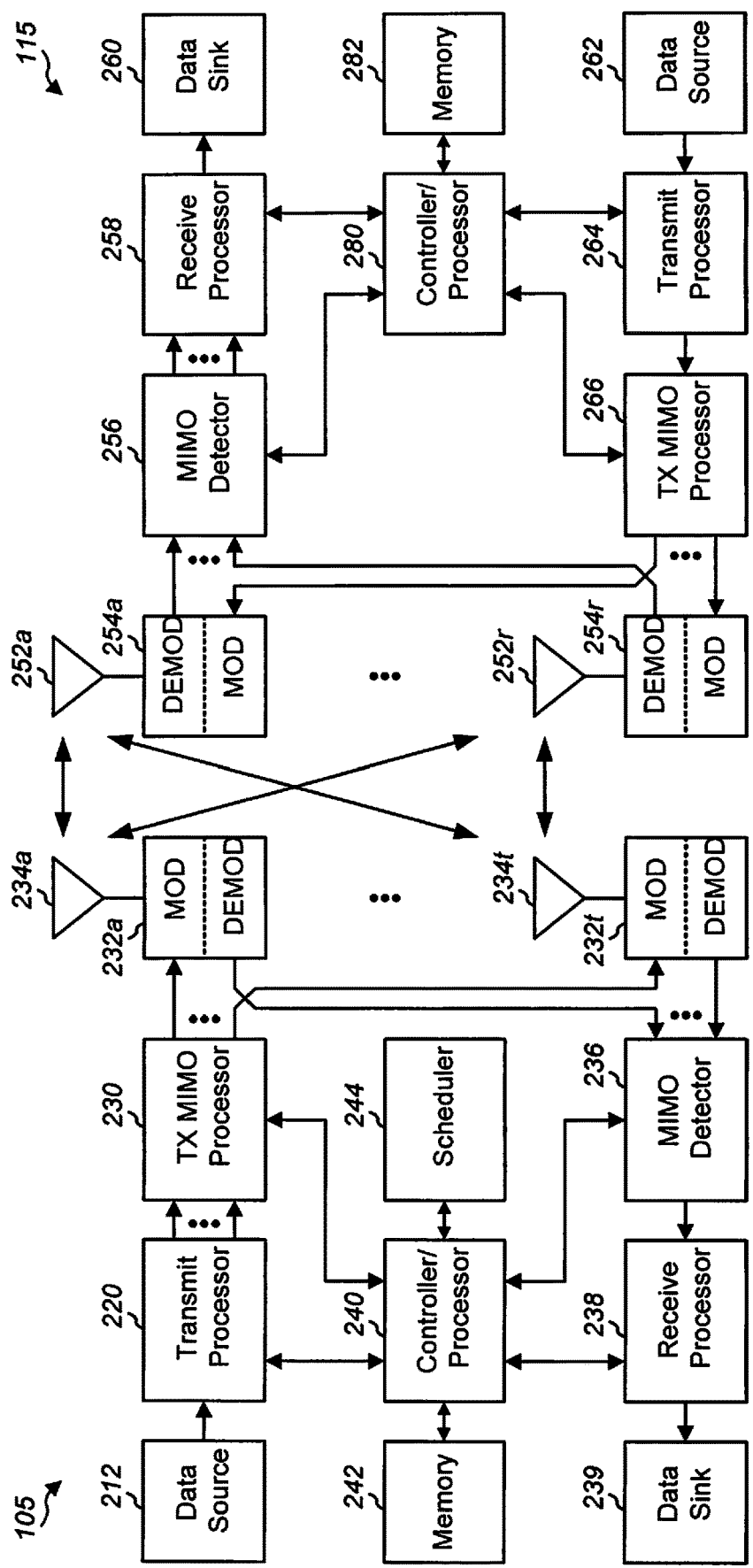
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5 and 6, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
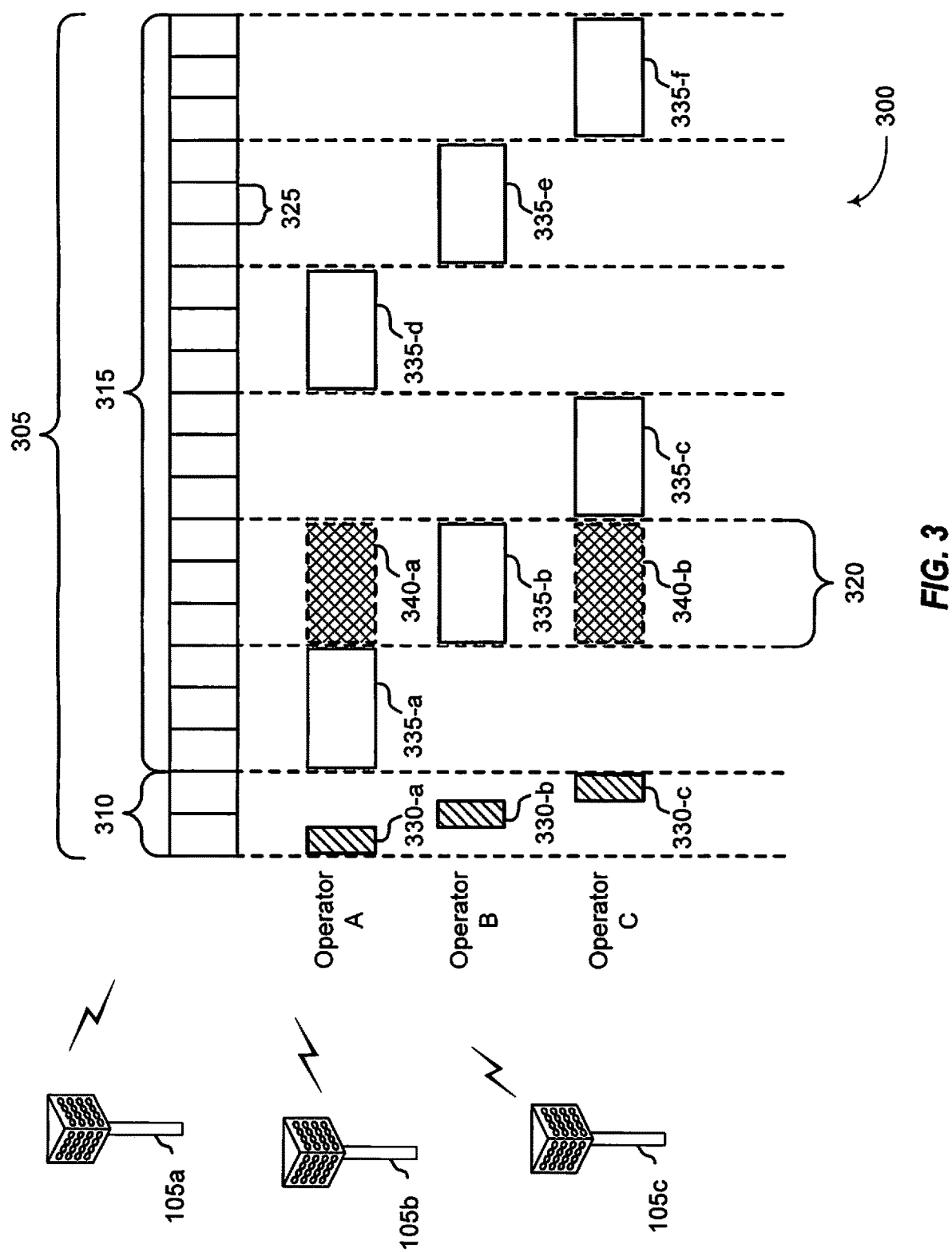
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Spatial listen before talk (LBT) transmission has been proposed in node implementations with multiple antennas. Compared to the traditional omni-directional LBT, a spatial LBT allows a node to transmit on the over an existing transmission by using the multiple spatial dimensions associated with the multiple antennas. With spatial LBT, the transmitter node measures the energy on the orthogonal space of the existing receive direction and determines how to transmit within the null space.

Figure 4:
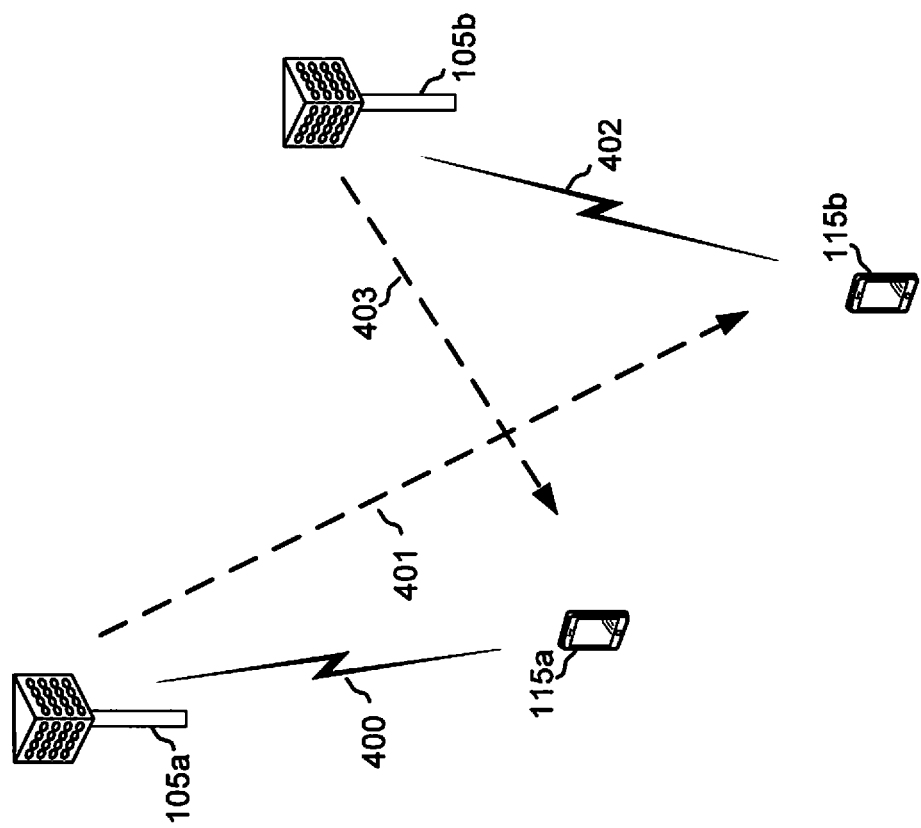
FIG. 4 is a block diagram illustrating gNBs communicating over shared transmission media with UEs.

FIG. 4 is a block diagram illustrating gNBs 105a and 105b communicating over shared transmission media with UEs 115a and 115b. Each of the communications pairs of gNB 105a-UE 115a and gNB 105b-UE 115b may communicate using different links over the shared transmission media. In this first example implementation described according to the illustration of FIG. 4, first link 400 between gNB 105a and UE 115a is a 1×1 link, having a single receive antennas and a single transmit antenna. Communication between gNB 105a and UE 115a count down their random number first for contention window access and occupy first link 400 before the communication pair of gNB 105b-UE 115b. The link between gNB 105b and UE 115b, second link 402 is a 2×2 link, having two receive antennas and two transmit antennas. Moreover UE 115a is geographically close to gNB 105b. Traditionally, gNB 105b would observe high energy from UE 115a and, in response, would refrain from transmission so as not to cause interference to UE 115a. However, by using spatial LBT, gNB 105b may transmit in the unused orthogonal space of first link 400 to ensure that its transmission of second link 401 causes minimal interference to UE 115a. This may be achieved by using the two transmit antennas on gNB 105b.

For example, with its 1×1 first link 400, gNB 105b as the transmitter detects unused orthogonal spectrum 401 (e.g., null space, null spectrum) and its 2×2 second link 402 as a transmission within unused orthogonal spectrum 401. gNB 105b may implement such transmission either by using beamforming of beam 403 and second link 402, or may transmit data to UE 115b on second link 402 and transmit a nulling signal on beam 403 that is formed to cancel or reduce interference seen by UE 115a from the transmission of data on second link 402.

Using spatial LBT, thus, increases the medium utilization by exploiting the spatial dimension. However, it may also introduce some fairness issues. For example, when all of the links have the same spatial dimension (same order of transmitter and receiver), the fairness of medium access may be maintained, as compared to the traditional energy sensing or preamble detection fairness methods. When different links have different MIMO capability, such as described above in the first example illustrated in FIG. 4, the fairness of medium access could be impacted. In reference again to the first example above, first link 400 is a 1×1 link, while second link 402 is a 2×2 link. The mechanisms for medium access may include either an asynchronous contention window-based access or a synchronous priority-based medium access. For the priority-based medium access, each link (e.g., first link 400 and second link 402) have an equal probability to obtain the top priority and the second priority. However, with spatial LBT, transmissions between gNB 105a and UE 115a using first link 400 do not benefit from a higher MIMO capability because of its antenna limitation, while transmissions between gNB 105b and UE 115b using the multiple transmit antennas of second link 402 can generally transmit whether or not first link 400 is occupied. For example, gNB 105b and UE 115b may transmit using second link 402 when access to the transmission medium passes an energy detection test, or it can transmit when first link 400 passes an energy detection test by using the null space from first link 400. However, in the presence of any channel estimation inaccuracy, timing/frequency error, Doppler mismatch, etc., the null space may not be fully transparent to any on-going transmissions. Thus, some level of interference may be introduced into first link 400 by the spatial LBT transmission in beam 403 by gNB 105*b* in the null space of orthogonal spectrum 401. Thus, under the conditions described with respect to this first example, first link 400, with the lower MIMO capability, would be at disadvantage.

To prevent the link with the lower MIMO capability from being at too much of a disadvantage, one solution that has been suggested is that, if the higher capability link performs spatial LBT on top of the existing transmission, the higher capability link would then terminate its transmission according to the existing transmission opportunity and start a new random counter in the contention window for medium access. However, this solution may lead to the higher MIMO capability link underutilizing the medium. For example, the higher MIMO capability node would now have a new random counter every time it transmits, regardless of whether it uses all spatial dimensions or uses the left over spatial dimension from the existing transmission through spatial LBT. That is, at every transmission opportunity, the higher MIMO capability node would redraw a random number for counting down with the other nodes sharing the medium. On other hand, the lower MIMO capability node may accumulate the random counter credit and count down from the previous counter mechanism. The higher MIMO capability node could, instead, elect not to use the left over spatial dimension in a spatial LBT transmission, so as not to suffer from the unequal medium access opportunity. However, this would reduce the overall system capacity.

With spatial LBT, when the first link has additional spatial dimension, the first link may choose to null out its transmission to the subsequent link. Such a mechanism may be referred to as polite spatial LBT. With reference back to FIG. 4, in this second example illustrated through FIG. 4, communications between gNB 105*a* and UE 115*a* using first link 400 is a higher MIMO capability (e.g., 2×2, 4×4, 8×8, etc.). In electing to perform polite spatial LBT, gNB 105*a*, for example, when transmitting to UE 115*a*, may transmit the data over first link 400 to UE 115*a* and form a nulling signal on beam 401 that would null out the observation of the transmission over first link 400 by UE 115*b*. This technique can effectively increase the overall system throughput, as it may potentially improve the received SINR for second link 402. However, first link 400 may not be able to fully realize its transmit beamforming gain as it would some antennas to null the signal over beam 401 for the sake of second link 402. That is, first link 400 sacrifices somewhat for a better overall system performance. For example, first link 400 from gNB 105*a* may transmit data to UE 115*a* by minimizing its interference to UE 115*b*. This allows gNB 105*b* to serve a better rate to UE 115*b* over second link 402. Various aspects of the present disclosure provide for improving fairness considerations with spatial LBT operations.

Figure 5:
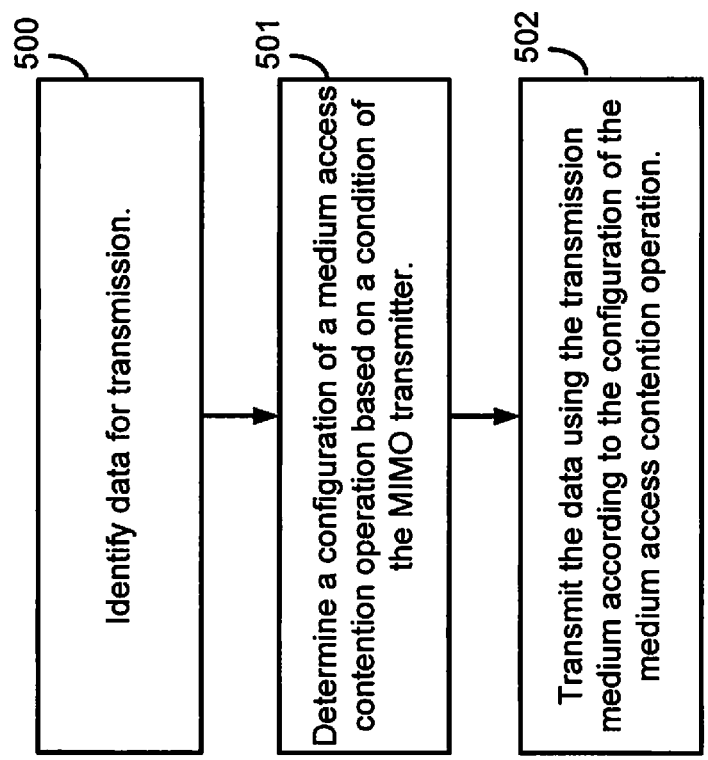
FIGS. 5 and 6 are block diagrams illustrating example blocks executed to implement aspects of the present disclosure.
Figure 7:
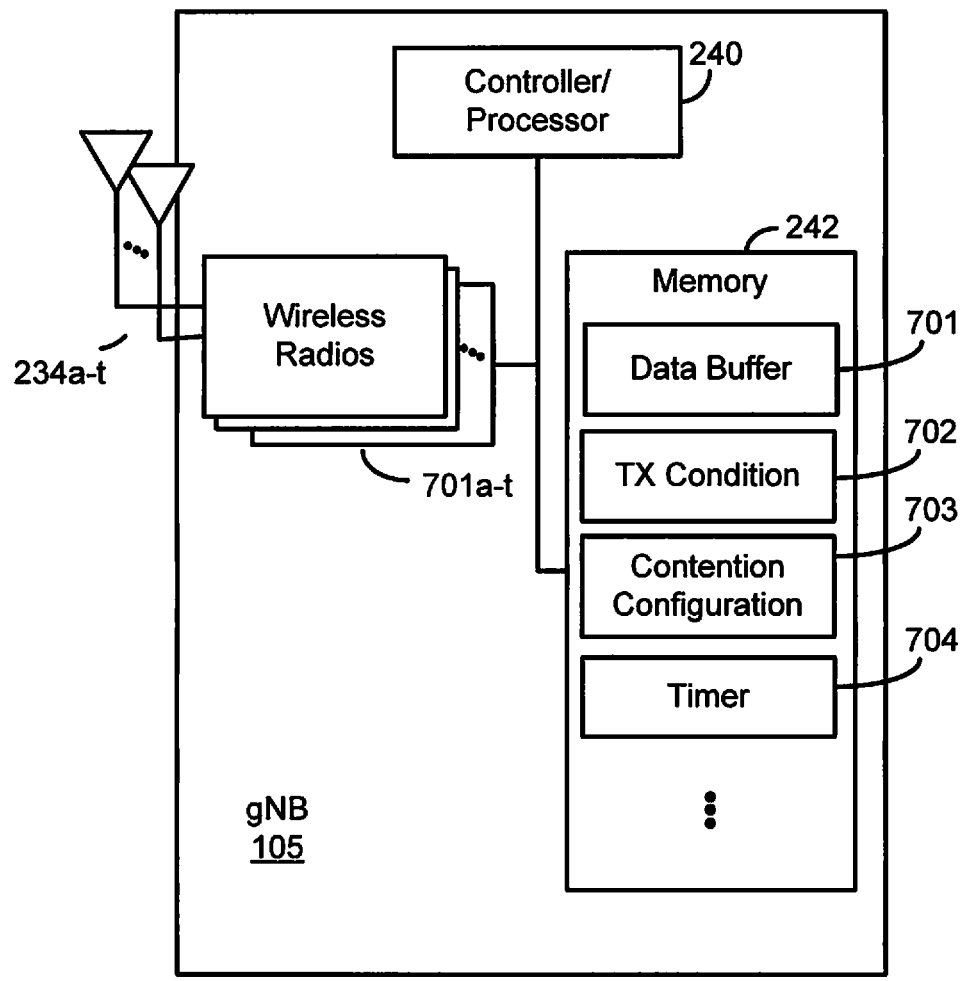
FIG. 7 is a block diagram illustrating an example gNB configured according to aspects of the present disclosure.

FIG. 5 is a block diagram illustrating example blocks executed to implement one aspect of the present disclosure. The example blocks will also be described with respect to gNB 105 as illustrated in FIG. 7. FIG. 7 is a block diagram illustrating gNB 105 configured according to one aspect of the present disclosure. gNB 105 includes the structure, hardware, and components as illustrated for gNB 105 of FIG. 2. For example, gNB 105 includes controller/processor 240, which operates to execute logic or computer instructions stored in memory 242, as well as controlling the components of eNB 105 that provide the features and functionality of gNB 105. gNB 105, under control of controller/processor 240, transmits and receives signals via wireless radios 700*a-t* and antennas 234*a-t*. Wireless radios 700*a-t* includes various components and hardware, as illustrated in FIG. 2 for eNB 105, including modulator/demodulators 232*a-t*, MIMO detector 236, receive processor 238, transmit processor 220, and TX MIMO processor 230.

Figure 8:
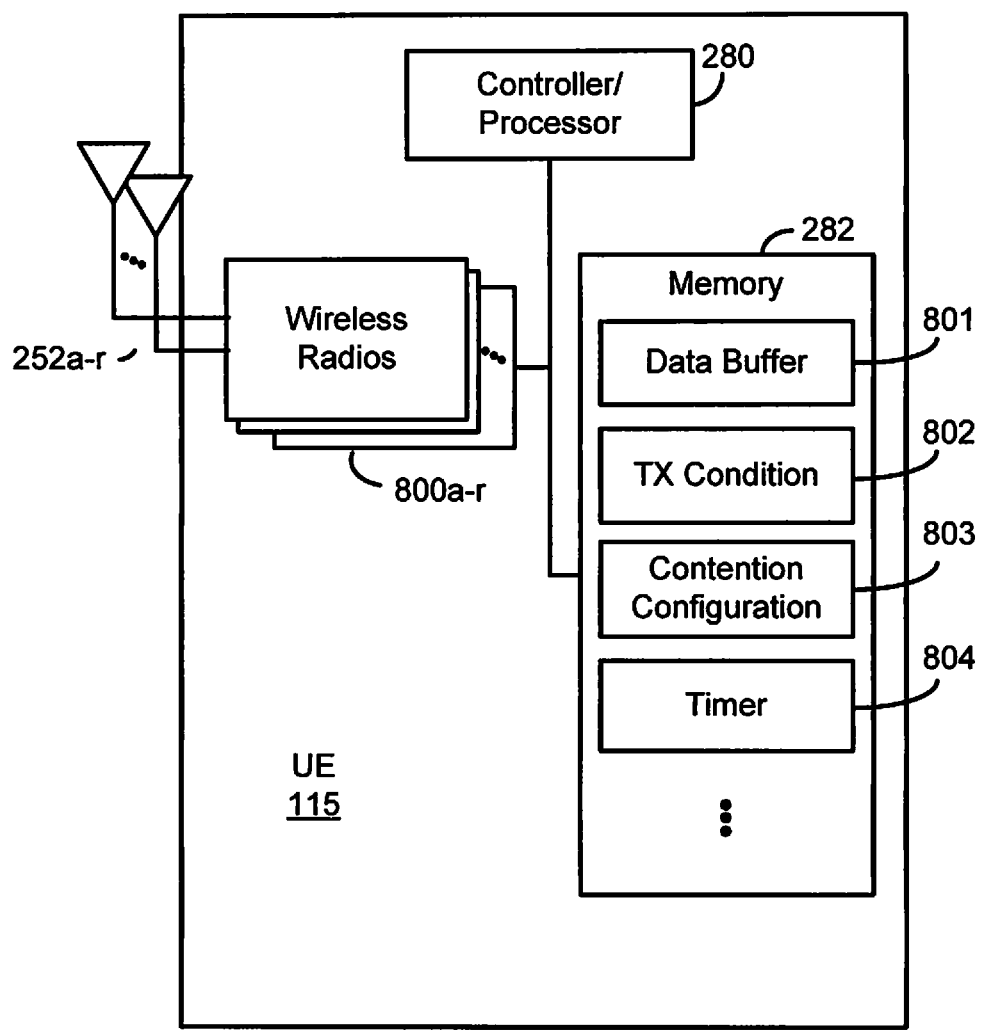
FIG. 8 is a block diagram illustrating an example UE configured according to aspects of the present disclosure.

The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for eNB 105, including modulator/demodulators 254*a-r*, MIMO detector 256, receive processor 258, transmit processor 264, and TX MIMO processor 266.

At block 500, a MIMO transmitter identifies data for transmission. Data can be identified by the transmitter either for transmission from a base station, such as gNB 105, to a UE, such as UE 115, or from a UE, such as UE 115, to a base station, such as gNB 105. The identification of data to be transmitted will trigger preparation for transmissions on the shared medium. For example, gNB 105 would detect data available in data buffer 701, stored in memory 242, to trigger the preparation, while UE 115 would detect data available in data buffer 801, stored in memory 282.

At block 501, the MIMO transmitter determines a configuration of a medium access contention operation based on a condition of the transmitter. The MIMO transmitter (e.g., gNB 105 or UE 115) may access the shared medium based on different types of contention operations. For example, the medium access contention operation may include an asynchronous medium access using a contention window for avoiding transmission collisions. In such an asynchronous medium access operation, before every frame transmission, the transmitter would select a random timer value within a given contention window range and countdown until the timer (e.g., timer 704 or timer 804) expires. After the timer expires, such as when the transmitter counts down to zero, the transmitter (e.g., gNB 105 or UE 115) may transmit on the frame via wireless radios 700*a-t* and antennas 234*a-t*, where gNB 105 is transmitting, or wireless radios 800*a-r* and antennas 252*a-r*, where UE 115 is transmitting. If a collision occurs during the transmission where the collision is typically detected via ACK/NACK feedback from the receiver, then the transmitter would typically increase the contention window size up to a fixed maximum contention window size. For the next frame transmission, the transmitter begins the random timer countdown with the updated contention window size to reduce the probability of a subsequent collision. Thus, contention window size would be the configuration stored in either contention configuration 703, for gNB 105, or contention configuration 803, for UE 105. Multiple transmitters contending for the same medium would each likely have a different random timer value.

The medium access contention operation may also include a priority-based synchronous medium access, in which case each of the competing transmitters may have a probability of accessing the highest priority link depending on the access priority assigned to each transmitter. The configuration for either contention configuration 703 or contention configuration 803 to be determined would include a contention window size for the asynchronous medium access operation or a medium access priority assignment for the priority-based synchronous medium access operation, while the condition of the transmitter upon which the configuration may be based may include the MIMO capability of the transmitter, such as whether the MIMO transmitter is 1×1, 2×2, 4×4, etc., or whether the transmitter has enabled use of a polite spatial LBT procedure. A polite spatial LBT procedure provides for a MIMO transmitter to use some of its spatial dimensions to minimize or null its transmission interference to any unintended receivers in order to reduce any interference at that unintended receiver caused by the MIMO transmitter's data transmission to its intended receiver. Thus, based on either the MIMO capability or enablement of the polite spatial LBT procedure, the MIMO transmitter would determine either the contention window size or assigned priority for media access. At block 502, the MIMO transmitter transmits the data using the transmission medium according to the configuration. For gNB 105, the data would be transmitted using wireless radios 700a-t and antennas 234a-t, or for UE 115 the data would be transmitted using wireless radios 800a-r and antennas 252a-r.

Referring back to FIG. 4, an example operation of aspects of the present disclosure propose to address the fairness with heterogeneous MIMO links. In such example aspect, first link 400 between gNB 105a and UE 115a may be a 1×1 link, while second link 402 between gNB 105b and UE 115b may be a 4×4 link. With the asynchronous medium access, the contention window size for both first link 400 and second link 402 is a function of the MIMO capability which benefits from spatial LBT. For example, the 1×1 first link 400 may have a different contention window size compared to the higher MIMO capability second link 402, which uses spatial LBT.

When operating with a priority based synchronous medium access, the priority assignment for first link 400 and second link 402 may also be a function of the MIMO capability which benefits from spatial LBT. For example, the 1×1 first link 400 may have more than 50% probability of using the highest priority to compensate for the impact of the interference from the higher MIMO dimension second link 402.

An additional example operation of an aspect of the present disclosure illustrated by FIG. 4 provides for use of polite spatial LBT. For purposes of this example, first link 400 between gNB 105a and UE 115a may be a 2×2 link. First link 400 may use additional spatial dimension to minimize the impact of its transmissions as interference to second link 402 by sacrificing some of first link 400's transmission beamforming gain. In order to promote first link 400 to trade off its transmission beamforming gain in favor of using such additional spatial dimension to transmit nulling signals for second link 402, a different contention window size could be used depending on whether first link 400 enables polite spatial LBT. For example, when gNB 105a of first link 400 uses all its transmit antennas for beam forming to its own UE 115a, gNB 105a would have a larger contention window. However, when first link 400 enables polite spatial LBT to minimize interference to second link 402, gNB 105a could have a smaller contention window. First link 400 could then null interference to second link 402 based on the latest channel information from second link 402.

When operating with the priority based synchronous medium access, the priority assignment could depend on whether first link 400 has polite spatial LBT enabled for nulling out interference for second link 402. For example, when gNB 105a of first link 400 uses all its transmit antennas for beam forming to its own UE 115a, gNB 105 may have a smaller probability of using the highest priority link. However, when gNB 105a of first link 400 enables polite spatial LBT to minimize interference to second link 402, gNB 105a could have a larger probability of using the highest priority link.

Figure 6:
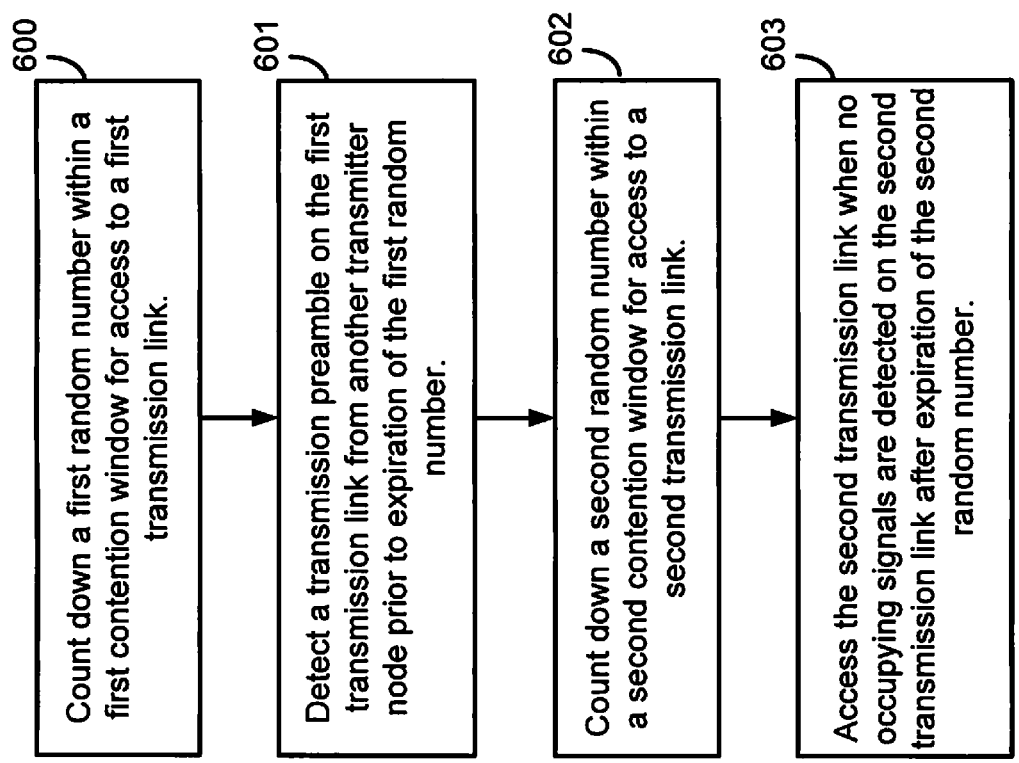

FIG. 6 is a block diagram illustrating example blocks executed to implement one aspect of the present disclosure. At block 600, a MIMO transmitter counts down a first random number within a first contention window for access to a first transmission link. With spatial LBT, the secondary links (e.g., second link 402 (FIG. 4)) may attempt opportunistic transmission by using the null space of unused orthogonal spectrum 401 of first link 400. Collisions may happen when multiple nodes in second link 402 attempt to use unused orthogonal spectrum 401 at the same time.

At block 601, the MIMO transmitter detects a transmission preamble on the first transmission link from another transmitter node prior to expiration of the first random number. To minimize the collision, each node of first link 400 and second link 402 can maintain different contention window sizes, different random backoffs, different random numbers, and different countdowns depending on whether it belongs to first link 400, second link 402, etc. With the assumption that the nodes of first link 400 have the lowest random number and, thus, access the medium of first link 400 and sends out the transmission preamble. All nodes of second link 402 detects the preamble and begins spatial LBT.

At block 602, the MIMO transmitter counts down a second random number within a second contention window for access to a second transmission link. To avoid the contention within second link 402, a new random number with a new contention window for nodes of second link 402 are started for the spatial LBT for each node in second link 402. At block 603, the MIMO transmitter accesses the second transmission link when no occupying signals are detected on the second transmission link after expiration of the second random number. Of the nodes counting down second random numbers in the second contention window for unused orthogonal space 401, when one node counts down first and no other signals occupy the null space, the transmitting node may begin spatial LBT transmissions in the null space of first link 400.

When one of the multiple nodes of second link 402 secures access to the null space of first link 400, the remaining links may then restart yet another random number with another contention window for a third link for possible transmission on the remaining unused spatial dimension. The contention windows for each of the different links may be updated independently, such that the negative acknowledgment (NAK) in second link 402 does not affect the contention window update for first link 400 on the same node.

Additionally, for a particular node, the contention window may be different depending on whether the node ends the transmission from first link 400, second link 402, or third link (not shown), etc. For example, if a node ends its transmission opportunity where the node accesses the medium with first link 400, that is, before the node starts transmission, the medium is idle. Thus, the node may generate a random number for the next medium access contention based on one contention window size. Otherwise, if a node ends its transmission opportunity where the node transmits on top of existing transmission and uses the null space of the existing transmission, the node may generate a random number for the next medium access contention based on another contention window size, and the like.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5 and 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method of wireless communication, comprising:
identifying, by a multiple input, multiple output (MIMO) transmitter, data for transmission, wherein the MIMO transmitter communicates using a transmission medium shared by one or more transmitter-receiver pairs;
determining, by the MIMO transmitter, a configuration of a medium access contention operation based on a condition of the MIMO transmitter; and transmitting the data by the MIMO transmitter using the transmission medium according to the configuration of the medium access contention operation.

2. The method of claim 1, wherein the configuration includes a contention window size, the medium access contention operation includes contention window access, and the condition includes a MIMO capability of the MIMO transmitter for determination to perform spatial listen before talk (LBT) transmission.

3. The method of claim 2, wherein the determining the configuration includes:
identifying the MIMO capability of the MIMO transmitter for determination to perform spatial LBT transmission;
setting a contention window for the contention window access according to the contention window size associated with the identified MIMO capability, wherein the contention window size corresponding to a higher MIMO capability is shorter when the MIMO transmitter performs the spatial LBT transmission than the contention window size corresponding to a lower MIMO capability; and
counting down, by the MIMO transmitter, a random counter within the contention window.

4. The method of claim 1, wherein the configuration includes a medium access priority assignment, the medium access contention operation includes a priority-based synchronous medium access, and the condition includes a MIMO capability of the MIMO transmitter for determination to perform spatial LBT transmission.

5. The method of claim 4, wherein the determining the configuration includes:
identifying the MIMO capability of the MIMO transmitter;
obtaining the medium access priority assignment associated with the MIMO capability, wherein the medium access priority assignment corresponding to a higher MIMO capability is lower than the medium access priority assignment corresponding to a lower MIMO capability when the MIMO transmitter performs the spatial LBT transmission; and
accessing the transmission medium according to the medium access priority assignment.

6. The method of claim 1, wherein the configuration includes a contention window size, the medium access contention operation includes contention window access, and the condition includes an enabled transmission nulling.

7. The method of claim 6,
wherein the determining the configuration includes:
detecting the MIMO transmitter is configured with the enabled transmission nulling;
setting a contention window for the contention window access according to the contention window size associated with the enabled transmission nulling, wherein the contention window size corresponding to the enabled transmission nulling is shorter when the MIMO transmitter performs the spatial LBT transmission than the contention window size corresponding to a disabled transmission nulling; and
counting down, by the MIMO transmitter, a random counter within the contention window; and
wherein the transmitting includes:
transmitting the data to a receiver of the data; and
transmitting a nulling signal to a neighboring receiver, wherein the nulling signal is formed to reduce interference at the neighboring receiver caused by the transmitting the data.

8. The method of claim 7, further including:
receiving, at the MIMO transmitter, a configuration signal configuring the MIMO transmitter to enable transmission nulling.

9. The method of claim 1, wherein the configuration includes a medium access priority assignment, the medium access contention operation includes a priority-based synchronous medium access, and the condition includes an enabled transmission nulling.

10. The method of claim 9,
wherein the determining the configuration includes:
detecting the MIMO transmitter is configured for the enabled transmission nulling;
setting the medium access priority according to the enabled transmission nulling, wherein the medium access priority corresponding to the enabled transmission nulling is shorter when the MIMO transmitter performs the spatial LBT transmission than the medium access priority corresponding to a disabled transmission nulling; and
accessing the transmission medium according to the medium access priority assignment; and
wherein the transmitting includes:
transmitting the data to a receiver of the data; and
transmitting a nulling signal to a neighboring receiver, wherein the nulling signal is formed to reduce interference at the neighboring receiver caused by the transmitting the data.

11. The method of claim 10, further including:
receiving, at the MIMO transmitter, a configuration signal configuring the MIMO transmitter to enable transmission nulling.

12. An apparatus configured for wireless communication, the apparatus comprising:
at least one processor; and
a memory coupled to the at least one processor,
wherein the at least one processor is configured:
to identify, by a multiple input, multiple output (MIMO) transmitter, data for transmission, wherein the MIMO transmitter communicates using a transmission medium shared by one or more transmitter-receiver pairs;
to determine, by the MIMO transmitter, a configuration of a medium access contention operation based on a condition of the MIMO transmitter; and
to transmit the data by the MIMO transmitter using the transmission medium according to the configuration of the medium access contention operation.

13. The apparatus of claim 12, wherein the configuration includes a contention window size, the medium access contention operation includes contention window access, and the condition includes a MIMO capability of the MIMO transmitter for determination to perform spatial listen before talk (LBT) transmission.

14. The apparatus of claim 13, wherein the configuration of the at least one processor to determine the configuration includes configuration of the at least one processor:
to identify the MIMO capability of the MIMO transmitter for determination to perform spatial LBT transmission;
to set a contention window for the contention window access according to the contention window size associated with the identified MIMO capability, wherein the contention window size corresponding to a higher MIMO capability is shorter when the MIMO transmitter performs the spatial LBT transmission than the contention window size corresponding to a lower MIMO capability; and to count down, by the MIMO transmitter, a random counter within the contention window.

15. The apparatus of claim 12, wherein the configuration includes a medium access priority assignment, the medium access contention operation includes a priority-based synchronous medium access, and the condition includes a MIMO capability of the MIMO transmitter for determination to perform spatial LBT transmission.

16. The apparatus of claim 15, wherein the configuration of the at least one processor to determine the configuration includes configuration of the at least one processor:
to identify the MIMO capability of the MIMO transmitter;
to obtain the medium access priority assignment associated with the MIMO capability, wherein the medium access priority assignment corresponding to a higher MIMO capability is lower than the medium access priority assignment corresponding to a lower MIMO capability when the MIMO transmitter performs the spatial LBT transmission; and
to access the transmission medium according to the medium access priority assignment.

17. The apparatus of claim 12, wherein the configuration includes a contention window size, the medium access contention operation includes contention window access, and the condition includes an enabled transmission nulling.

18. The apparatus of claim 17,
wherein the configuration of the at least one processor to determine the configuration includes configuration of the at least one processor:
to detect the MIMO transmitter is configured with the enabled transmission nulling; and
to set a contention window for the contention window access according to the contention window size associated with the enabled transmission nulling, wherein the contention window size corresponding to the enabled transmission nulling is shorter when the MIMO transmitter performs the spatial LBT transmission than the contention window size corresponding to a disabled transmission nulling; and
to count down, by the MIMO transmitter, a random counter within the contention window, and
wherein the configuration of the at least one processor to transmit includes configuration of the at least one processor:
to transmit the data to a receiver of the data, and
to transmit a nulling signal to a neighboring receiver, wherein the nulling signal is formed to reduce interference at the neighboring receiver caused by execution of the configuration of the at least one processor to transmit the data.

19. The apparatus of claim 18, further including configuration of the at least one processor to receive, at the MIMO transmitter, a configuration signal configuring the MIMO transmitter to enable transmission nulling.

20. The apparatus of claim 12, wherein the configuration includes a medium access priority assignment, the medium access contention operation includes a priority-based synchronous medium access, and the condition includes an enabled transmission nulling.

21. The apparatus of claim 20,
wherein configuration of the at least one processor to determine the configuration includes configuration of the at least one processor:
to detect the MIMO transmitter is configured for the enabled transmission nulling; and
to set the medium access priority according to the enabled transmission nulling, wherein the medium access priority corresponding to the enabled transmission nulling is shorter when the MIMO transmitter performs the spatial LBT transmission than the medium access priority corresponding to a disabled transmission nulling; and
to access the transmission medium according to the medium access priority assignment; and
wherein the configuration of the at least one processor to transmit includes configuration of the at least one processor:
to transmit the data to a receiver of the data, and
to transmit a nulling signal to a neighboring receiver, wherein the nulling signal is formed to reduce interference at the neighboring receiver caused by execution of the configuration of the at least one processor to transmit the data.

22. The apparatus of claim 21, further including configuration of the at least one processor to receive, at the MIMO transmitter, a configuration signal configuring the MIMO transmitter to enable transmission nulling.

23. A non-transitory computer-readable medium having program code for a wireless communication device recorded thereon, the program code executable by a processor of the wireless communication device for causing the processor to:
identify, by a multiple input, multiple output (MIMO) transmitter, data for transmission, wherein the MIMO transmitter communicates using a transmission medium shared by one or more transmitter-receiver pairs;
determine, by the MIMO transmitter, a configuration of a medium access contention operation based on a condition of the MIMO transmitter; and
initiate transmission of the data by the MIMO transmitter using the transmission medium according to the configuration of the medium access contention operation.

24. The non-transitory computer-readable medium of claim 23, wherein the configuration includes a contention window size, the medium access contention operation includes contention window access, and the condition includes a MIMO capability of the MIMO transmitter for determination to perform spatial listen before talk (LBT) transmission.

25. The non-transitory computer-readable medium of claim 24, wherein the program code further comprises program code for causing the processor to:
identify the MIMO capability of the MIMO transmitter for determination to perform spatial LBT transmission;
set a contention window for the contention window access according to the contention window size associated with the identified MIMO capability, wherein the contention window size corresponding to a higher MIMO capability is shorter when the MIMO transmitter performs the spatial LBT transmission than the contention window size corresponding to a lower MIMO capability; and
count down, by the MIMO transmitter, a random counter within the contention window.

26. The non-transitory computer-readable medium of claim 23, wherein the configuration includes a contention window size, the medium access contention operation includes contention window access, and the condition includes an enabled transmission nulling.

27. The non-transitory computer-readable medium of claim 26, wherein the program code further comprises program code for causing the processor to:
detect the MIMO transmitter is configured with the enabled transmission nulling;

setting a contention window for the contention window access according to the contention window size associated with the enabled transmission nulling, wherein the contention window size corresponding to the enabled transmission nulling is shorter when the MIMO transmitter performs the spatial LBT transmission than the contention window size corresponding to a disabled transmission nulling; and counting down, by the MIMO transmitter, a random counter within the contention window; and wherein the program code further comprises program code for causing the processor to:

initiate transmission of the data to a receiver of the data; and initiate transmission of a nulling signal to a neighboring receiver, wherein the nulling signal is formed to reduce interference at the neighboring receiver caused by the transmitting the data.

28. The non-transitory computer-readable medium of claim 27, the program code further causing the processor to:

receive, at the MIMO transmitter, a configuration signal configuring the MIMO transmitter to enable transmission nulling.

* * * * *